United States Patent [19]
Farkas

[11] 3,821,428
[45] June 28, 1974

[54] METHOD FOR PREPARING LOW-CALORIE AERATED STRUCTURE

[75] Inventor: Elizabeth Farkas, Yonkers, N.Y.

[73] Assignee: General Foods Corporation, White Plains, N.Y.

[22] Filed: July 21, 1972

[21] Appl. No.: 274,032

[52] U.S. Cl. ................ 426/141, 426/213, 426/351, 426/804
[51] Int. Cl. ............................................. A23l 1/18
[58] Field of Search ...................... 99/1, 81, 82, 83

[56] References Cited
UNITED STATES PATENTS

| | | | |
|---|---|---|---|
| 3,097,946 | 7/1963 | Menzi | 99/1 |
| 3,505,076 | 4/1970 | Maloney | 99/81 |
| 3,574,634 | 4/1971 | Singer | 99/83 |

*Primary Examiner*—Raymond N. Jones
*Attorney, Agent, or Firm*—Thaddius J. Carvis; Daniel J. Donovan; Bruno P. Struzzi

[57] ABSTRACT

A puffed foam-like structured food product is made by baking a dough piece from a mixture of xanthan gum and dextrin.

4 Claims, No Drawings

METHOD FOR PREPARING LOW-CALORIE AERATED STRUCTURE

BACKGROUND OF THE INVENTION

This invention relates to a novel, extremely aerated and crisp structure and the method of preparing the same. Specifically it concerns the novel method of preparing a composition of xanthan gum and dextrin from which the puffed, low-calorie structured product is derived.

Heretofore, it has been the practice to produce puffed food products such as cereals and snacks from a cooked dough which is formed into pellets and thereafter subjected to heat and a sudden decrease in pressure so that the pellet will expand in size, after which the pellets are dried in their expanded condition. This process has come to be known and gun-puffing.

The prior art also describes a process for the manufacture of porous bakery or food products from an uncooked dough which is formed into pellets and thereafter very carefully dried at low temperatures so as not to disrupt the starch granules or the moisture contained therein. These substantially air dried pellets are then subjected to heat and a differential in pressure so that the pellets will expand in size and assume a porous structure.

More recent attempts at making a puffed snack or cereal product are evidenced in U.S. Pat. No. 3,505,076 issued Apr. 7, 1970 in which it is taught that a cereal grain matrix chosen from the group consisting of puffed cereal grains and puffed cereal doughs is impregnated with a slurry comprised of fat and starch. Accordingly, additional quantities of starch may be added prior to the cooking step to improve the puffability of the resultant product.

In the case of the uncooked dough which is formed into pellets and subsequently gun-puffed, in addition to objectionable clustering or sticking together of these pellets, the resulting product is not of adequate (i.e., sufficiently low) density and crispness of texture to render a suitable snack-type product. In addition, if temperatures and pressures in gun-puffing are increased in order to obtain the density and texture necessary, the material shatters very badly. Such approaches are therefore not commercially practical.

Regarding the fat/starch complex impregnated system, the starch is present in the slurry in an amount sufficient to substantially coat the surface of the cereal matrix when the same is impregnated with the slurry and in order to fill the pores of the expanded matrix to maintain the puffed character of the product. The end result is a product offering a stable puffed structure but one which is virtually held together with calories.

SUMMARY OF THE INVENTION

It has been found that xanthan gum commercially known as "Keltrol," and dextrin work synergistically to produce a puffed product when baked. More specifically, when these two edible components are mixed with water to form a dough, allowed to stand for a period of hours and subsequently baked for a short period of time, an extremely aerated, freeze-dried-like structure is derived which closely resembles the standard gun-puffed cereals and crunchy popcorn-like products.

This puffing effect was indeed unexpected since those skilled in the art most often associate such a puffing phenomenon with the presence of starch granules. For example, in the case of oatmeal, the starch is in the form of minute granules which are only slightly soluble in water at room temperature. When subjected to heat in the presence of water, these starch granules rupture producing the puffed effect. In the case of salt-puffing, virtually the same effect is derived when the sodium chloride crystals disrupt the starch granules by giving off moisture when subjected to heat, thus causing the starch granules to rupture and expand. The "secret" to puffed cereals, snacks and the like therefore has been the presence of starch granules.

The advantages of this novel puffed product are numerous. Not only does it offer a simplified method of producing a puffed foodstuff, thus alleviating the need for more complex processes such as gun-puffing, salt-puffing, steam-puffing and the like, but it represents a unique low-calorie product which is economical to produce.

It is therefore, a principal object of this invention to provide a puffed low-calorie foodstuff.

DESCRIPTION OF THE INVENTION

The composition of this invention is prepared from a mixture of xanthan gum and dextrin.

Dextrin is well-known in the art as being a starch gum produced by the incomplete hydrolysis of starch, having the general formula $(C_6H_{10}O_5)_n \cdot x\, H_2O$. It is more commonly regarded as a product of cereal degradation.

Xanthan gum however, is a fermentation product of glucose and is commonly referred to as being a fermentation gum. The xanthan gum which is employed in this invention may be illustrated by the Xanthomonas colloid produced by the bacterium Xanthomonas campestris. By the process of fermentation, a long chain polysaccharide is formed which has a periodically repeating "glucose-mannose-glucuronic acid" configuration that is believed to be the key factor in its unique properties. The production of xanthan gum is more fully described in U.S. Pat. No. 3,507,664. An added feature of xanthan gum is that on an as is basis i.e., on the basis of its 15 percent digestibility, xanthan gum has a caloric value of 0.5 cal./gm.

It has been found that when xanthan gum and dextrin are combined with water to form a dough, allowed to stand and subsequently baked, a unique puffed, porous, fragile structure is derived. In order that this end result be achieved however, the proportion of xanthan gum to dextrin, the percentage of water present, and the temperature and duration of baking are relatively restricted. More important however are the methods of preparation and the time during which the dough is allowed to stand. These two factors are critical in achieving a puffed product.

A dry mix of xanthan gum and dextrin is first prepared, the ratios ranging from 1:2 to 2:1, preferably about 1:1 and subsequently mixed with water. The amount of water needed usually ranges from 40 to 50 percent to prevent the formation of a too dry or too wet product. The paste is "worked" to a shiny, stringy, dough-like consistency. It is critical that the dough be allowed to stand for a period of at least 18 to 24 hours prior to baking for the desired degree of puffing to occur; otherwise the resultant product is puffed but wet, sticky and soon collapses. Xanthan gum and dextrin are not chemically incompatible as other gums would be and it is believed that this rather extended "latent" period is required for these two compatible gums to orientate their polymer structures and consequently exhibit their synergistic effects in causing this puffed, porous, freeze-dried-like structure to form. The dough is subsequently rolled out, cut, and baked for about 15 to 20 min. in a 300°F to 400°F degree oven. The higher temperatures for shorter periods have been found to be necessary for the puffing effect to take place.

Various gums have been tested in combination with xanthan gum alone and with dextrin alone under the exact same experimental conditions as will be evidenced in the Tables herein included. A waxy maize starch was purposefully tested for its puffing qualities due to its amylopectin structure which has been found to yield a far greater degree of puffing than the non-waxy varieties (U.S. Pat. No. 2,526,792 issued Oct. 24, 1950). As is evidenced in the data presented herein, only the combination of xanthan gum and dextrin was able to demonstrate the unique puffing quality, their synergistic association being most evident in the inability of either component to reproduce these results when tested separately.

The following systems were prepared using the aforementioned specified conditions:

TABLE I

|  | A | B | C | D | E | Control |
|---|---|---|---|---|---|---|
| Xanthan gum | 50 |  |  |  | 25 | 25 |
| Dextrin |  | 50 | 25 | 25 |  | 25 |
| Gum guar |  |  | 25 |  |  |  |
| Gum tragacanth |  |  |  | 25 |  |  |
| Waxy maize starch |  |  |  |  | 25 |  |
| Water | 50 | 50 | 50 | 50 | 50 | 50 |
|  | 100 | 100 | 100 | 100 | 100 | 100 |

TABLE II

*Samples A-E and Control same as in Table I
X - Baked immediately after preparation
Y - Baked after standing for 24 hours

|  | A | B | C | D | E | Control |
|---|---|---|---|---|---|---|
| X | shiny, stringy puffed but collapsed | would not form a dough. Dried out on baking to a glassy, porous structure | retained shape of dough. Did not dry out on baking. Remained doughy | puffed, hollow, wet, wet, pale, small | collapsed hollow, shiny collapsed | puffed, shiny slightly wet, |
| Y | hard shell on outside, hollow center, porous slightly shiny |  |  | puffed but hollow, dry, dark, no foamy, porous structure | similar to X but greater puff, wet, pale collapsed | puffed, shiny, porous, dry foamy structure |

The xanthan gum/dextrin product is useful in variety of systems. For example after baking it can be filled with low fat cheese to produce a low-calorie cheese snack, or can be sprinkled with a variety of seasonings to produce numerous low-calorie flavored puffs e.g. onion, bacon, garlic and the like. It should be obvious to those skilled in the art that this invention finds utility as a filled snack or treat containing peanut butter, cheeses, or the like to provide a higher-calorie product. Depending upon the manner in which the dough is cut prior to baking, this invention finds utility in providing low-calorie salt sticks, pretzels, "beer-log" type products and the like. It is important to note that salt and similar seasoning and dry flavoring compounds should be dusted on the surface of the dough either prior to or after baking. For a filled product, said filling is best added following baking to allow the maximum puffing to occur.

In the following examples, there are given specific formulae illustrative of the present invention. These formulae are not to be construed as restrictive of the invention, however, as it will be obvious to those skilled in the art that specific systems may be mentioned without limiting the scope of the invention.

EXAMPLE I

The following xanthan gum/dextrin systems were mixed in the ratio of 3:2 and 1:2 respectively and worked with water in a mortar and pestle until shiny and stringy. After allowing them to stand for approximately 21 hours they were subsequently rolled out into a sheet of ⅛ inch thickness. Salt was sprinkled on the dough for seasoning. The dough was subsequently cut into ½ inch squares, placed on a baking sheet and baked in the oven for 15 minutes at 400°F.

A comparative calorie study was carried out on the xanthan gum/dextrin product and on popular carbohydrate-based and deep-fat fried snacks.

| Carbohydrate-based snacks: | |
|---|---|
| Salt sticks | 3.84 cal./gm. |
| Pretzels | 3.90 cal./gm. |
| Crackers | 3.84 cal./gm. |
| Xanthan gum/dextrin (60/40) | 1.90 cal./gm. |
| Deep-fat fried snacks: | |
| Fried pork rind | 5.49 cal./gm. |
| Potato chips | 5.68 cal./gm. |
| Xanthan gum/dextrin (33/66) | 2.83 cal./gm. |

EXAMPLE II

A dry mix of 50 percent xantham gum and 50 percent dextrin was made and combined with water to form a 50 percent water-containing paste. The paste was "worked" like a very sticky dough in a mortar and pestle until it became stringy and shiny. It was covered and let stand for 24 hours. Subsequently, it was rolled out into a sheet of ⅛ inch thickness with some salt sprinkled on it. One half inch squares were cut and placed on a baking sheet and baked in the oven at 400°F for 15 minutes. They puffed up into fragile, crisp pillow shaped pieces that remained shiny and had a foam-like structure in the center.

What is claimed is:

1. A method of preparing a low-calorie puffed foodstuff which comprises:
   a. preparing a dry mix of xanthan gum and dextrin within the ratio of 1:2 to 2:1;

b. combining the dry mixture of xanthan gum and dextrin with water to form a paste;
c. working with xanthan gum/dextrin paste until it assumes a stringy, shiny, dough-like consistency;
d. allowing the dough to stand for a period of at least 18 hours;
e. rolling out the dough to a thickness effective to produce a thin-crusted coherent product,
f. baking the xanthan gum/dextrin dough.

2. The method of claim 1 which comprises:
a. preparing a dry mix of xanthan gum and dextrin in the ratio of about 1:1;
b. combining the xanthan gum and dextrin mix with about 50 percent water to form a paste;
c. working the xanthan gum/dextrin paste until it becomes stringy, shiny, and dough-like;
d. allowing the dough to stand for 24 hours;
e. rolling out the dough to a thickness of ⅛ inch;
f. baking the xanthan gum/dextrin dough for 15 minutes in a 400°F oven.

3. The product produced by the process of claim 1.

4. The product produced by the process of claim 2.

* * * * *